US009019555B1

(12) United States Patent
Chappell et al.

(10) Patent No.: US 9,019,555 B1
(45) Date of Patent: Apr. 28, 2015

(54) AUTOMATICALLY CONFORMING PRINTED LABELS

(71) Applicant: Amazon Technologies, Inc., Reno, NV (US)

(72) Inventors: Gregory Louis Chappell, Seattle, WA (US); Adrian Paul Inglis, Bellevue, WA (US); Zhengqiang Xu, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/136,250

(22) Filed: Dec. 20, 2013

(51) Int. Cl.
*G06K 15/02* (2006.01)
*G06F 3/12* (2006.01)
*G06F 17/21* (2006.01)
*B41J 3/407* (2006.01)

(52) U.S. Cl.
CPC ............ *G06K 15/027* (2013.01); *G06K 15/024* (2013.01); *G06F 3/1243* (2013.01); *G06F 17/212* (2013.01); *B41J 3/4075* (2013.01)

(58) Field of Classification Search
None
See application file for complete search history.

(56) References Cited

U.S. PATENT DOCUMENTS

| 5,344,247 | A  | * | 9/1994 | Sakuragi et al. | 400/582 |
| 6,438,509 | B1 | * | 8/2002 | Hayama et al.   | 702/155 |
| 8,194,089 | B1 | * | 6/2012 | Ante et al.     | 345/545 |
| 2014/0153004 | A1 | * | 6/2014 | Tufano       | 358/1.2 |

* cited by examiner

*Primary Examiner* — Miya J Cato
(74) *Attorney, Agent, or Firm* — Arthorus, PLLC

(57) ABSTRACT

Printer devices occasionally cause electronic documents to be automatically contracted prior to printing, in order to ensure that all of the content to be printed will fit within the dimensions of a page. Where the electronic document includes information having close tolerances, such as information to be printed on an address label or other defined region on a sheet, the automatic contraction may cause the information to be misaligned with respect to the label or other defined region. Automatically expanding the information within the electronic document prior to printing may counter this effect, and increase the likelihood that the information will be printed within the label or other defined region for which it is intended.

23 Claims, 8 Drawing Sheets

AUTOMATICALLY CONFORMING PRINTED LABELS

BACKGROUND

Printers are common peripherals or accessories that may be used to generate printed outputs from an application operating on one or more computers. A printer may be configured to receive print requests from applications operating on a single, dedicated computer, or operating on one or more computers that may be connected to the printer via a network. Such applications may include word processors, accounting software, browsers or presentation programs, or any other type of application; and the printed output may be provided on paper or other suitable materials.

When a user of a computer application provides a print instruction to the application, an electronic document associated with the application (e.g., a word processing document, a spreadsheet, a rendered web page or a presentation) may be transmitted to the printer. A software application operating on the printer known as a printer driver may convert the electronic document into information or data that may be understood by the printer, and the information or data created by the printer driver may then serve as a genesis for the placement of portions of the electronic document on the printed output.

Many computers may be configured to print markings onto specially adapted paper or other planar or sheet-like materials having specific demarcations, regions or sectors formed thereon, such as labels that are to be applied to parcels, commercial products or other items. For example, a word processing application may be configured to place information within specific areas or frames of an electronic document, with one or more of the areas or frames corresponding to one or more demarcations, regions or sectors (e.g., a removable adhesive label) of a sheet. For example, when a sheet of adhesive removable labels is made available to a printer associated with or accessible to a word processing application, the information within the areas or frames of the electronic document may be printed onto the adhesive labels on the sheet. The adhesive labels may then be removed from the sheet and applied to any suitable surface.

Thus, computers and printers may be used to generate electronic documents having selected content that is placed into specific areas or frames, and to print the electronic documents onto one or more pieces of paper or other planar or sheet-like materials having demarcations, regions or sectors corresponding to the specific areas or frames of the electronic documents. The utility of such printed materials depends on the proper alignment and coordination between the specific areas or frames of an electronic document and the demarcations, regions or sectors of the paper on which the electronic document is to be printed.

DETAILED DESCRIPTION

Figure 1:
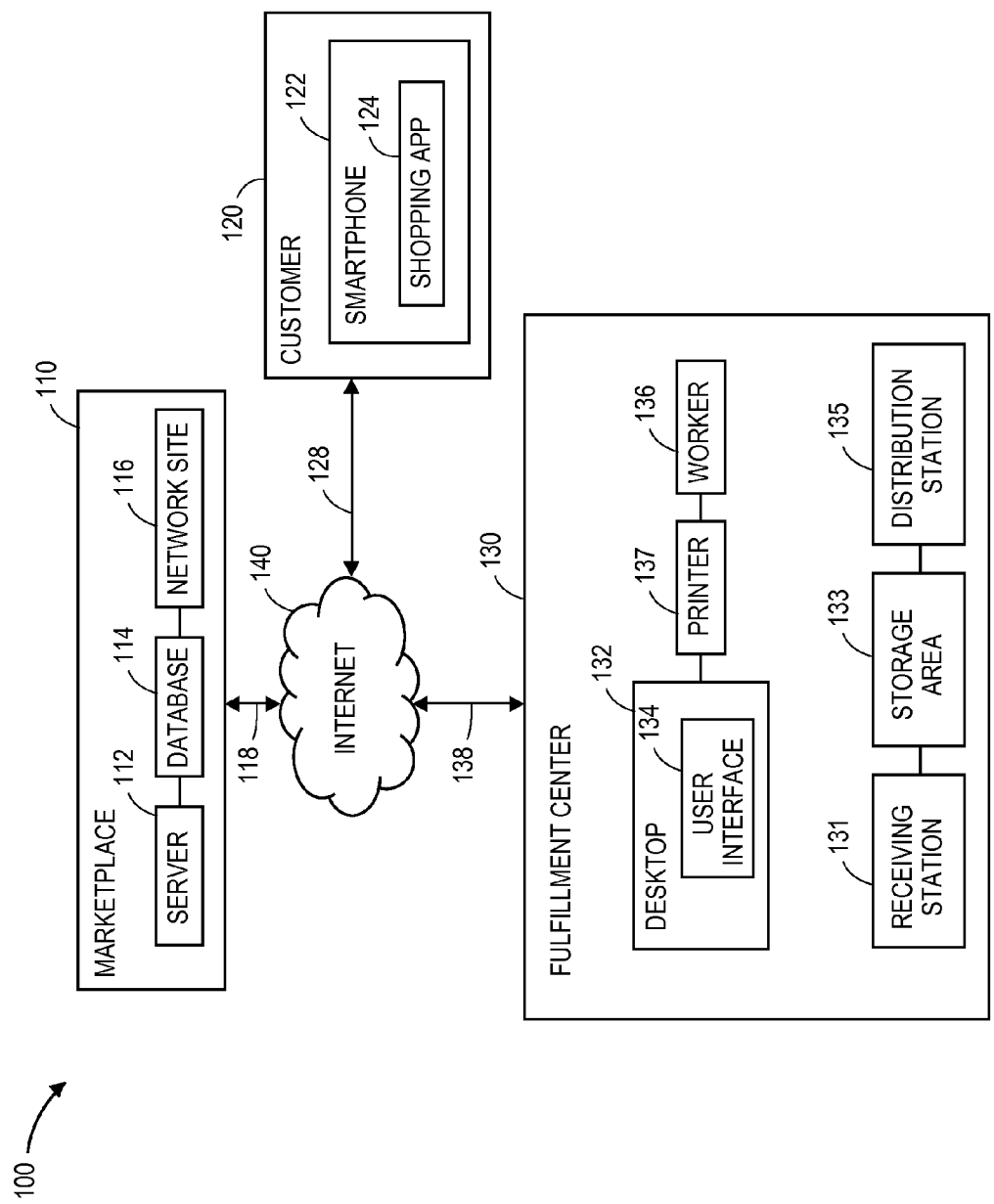
FIG. 1 is a block diagram of an illustrative system for generating automatically conforming printed labels in accordance with embodiments of the present disclosure.

As is set forth in greater detail below, the present disclosure is directed to providing automatically conforming printed labels. More specifically, the systems and methods disclosed herein are directed to identifying dimensions of electronic documents having images or other rendered content within one or more areas or frames that is intended to be printed onto pages of paper or other planar or sheet-like materials having a plurality of demarcations (or regions or sectors) defined therein, such as a sheet having one or more adhesive labels formed thereon, and automatically expanding such dimensions in anticipation of an automatic shrinkage or contraction thereof by a computing device or printer, or an application operating on either the computing device or the printer. The amount or extent of the expansion may be based on one or more dimensions of the areas or frames of the electronic document; on one or more dimensions of the content to be expressed within the areas or frames; on one or more dimensions of the demarcations; or on any shrinkage or contraction that may be expected or may have been previously observed through the use of the computing device, the printer, or any corresponding application. Additionally, the dimensions may be automatically expanded when the documents are originally generated or stored (e.g., saved in at least one data store), upon transmitting a command to print the documents to a printer, or at any other appropriate time.

Users of computer applications may generate a hard copy (e.g., paper) of content rendered by such applications with a simple command to a printer associated with a computing device. Such printers may be directly attached to the computing device as a peripheral or other accessory, or accessed by the computing device over one or more computer networks. When a user instructs a first application operating on a computing device to generate a hard copy of such content, a second application operating on the computing device, which may typically be called a printer driver, may convert data associated with the first application into a form that may be interpreted by a printer, and the printer may cause at least some of the content to be printed onto one or more pieces of paper. A printer driver or other printing application may be unique to the computing device, and may convert information associated with an application into data of a particular form that may be understood by a printer controller or other computing device associated with the printer, which may generate a printed hard copy based on the information.

Printers and other printing devices may be used to apply markings onto paper or flat, sheet-like products or surfaces any kind. One common printing device is a laser printer, which applies lasers to a rotating electronic drum in order to generate electrostatic, charged images thereon. The rotating drum attracts colored toner particles that form the printed images when the drum is rolled over the paper. Another common printer is an inkjet printer, which forms printed images using thousands of fine dots of ink that are sprayed onto paper from a print head that may move in a lateral direction across the paper as the paper is advanced through the printer. Such dots may have diameters that are smaller than a human hair, and may be sprayed in sufficiently high densities to generate high-resolution, high-quality images. A third common printer is a dot-matrix printer, which includes a print head having number of pointed rods or rod-like elements for striking a piece of paper through a ribbon or other inked material, thereby causing characters to be formed on the piece of paper. The systems and methods of the present disclosure may also apply to other types of printers, such as multidimensional (e.g., three-dimensional printers).

Computer printers may be used to generate hard copies of content rendered by nearly any computer-based application, and printers may apply markings in the form of text, digits, images or other rendered content to paper or to any other suitably thin, planar or sheet-like articles, at a high rate of speed. A typical laser printer may, for example, print dozens of sheets per minute. One common application in which printers are used for applying markings to sheets is in the generation of multi-layer adhesive labels, which may include a print-receptive upper layer, as well as one or more adhesive underlying layers affixed to a releasable substrate or liner. After the markings (which may include any type or kind of alphanumeric characters, symbols or information) are applied to an upper layer of an adhesive label of any size, the adhesive label may be removed from the substrate and affixed to any type or kind of item. Adhesive labels are used in a variety of common applications, including to apply or affix shipping addresses or return addresses to packages or parcels, or to apply or affix other types of information or identifiers to items such as groceries, clothing or automobile parts, to name a few examples. The number of uses for adhesive labels that are created using printers is practically unlimited.

Typically, multiple adhesive labels may be provided on a single sheet, with the labels arranged in the form of templates having a predefined array or matrix. The sheet may be of a standard size, such as "letter" paper eight-and-one-half inches wide by eleven inches tall (8.5"×11"), or "legal" paper eight-and-one-half inches wide by fourteen inches tall (8.5"×14"), and may include one or more adhesive labels defined by demarcations, regions or sectors that have been formed or carved into the array or matrix. Using one or more computer applications, such as a standard word processing or graphics application, an electronic file having one or more images or other sets of content arranged in areas or frames that correspond to the fixed dimensions of an array or matrix of demarcations on an adhesive label sheet template may be created and transmitted to a printer. After the sheet is passed through the printer, and the images or content within the areas or frames are printed onto the adhesive labels thereon, the individual adhesive labels may be releasably removed from the substrate and affixed to individual articles. Thus, using computers and printers, large numbers of adhesive labels may be mass-produced and used in any number of standard applications.

Occasionally, when preparing to print images or other information onto paper or other materials, a printer driver may automatically shrink or contract the dimensions of the images or information to be printed, for various reasons. For example, the image or information may be aligned too closely to an edge of the paper, which may be inaccessible to the rotating drums or print heads of the printer. In order to ensure that all of the content that is intended for printing on a piece of paper will actually fit onto the paper, the printer driver or other application may intentionally shrink or reduce the size of the content to be rendered by a predetermined percentage or ratio. Some common shrinkage percentages are ninety-four percent (or 94%), which will create an artificial margin of one-quarter inch (or 0.25") on either side of an eight-and-one-half inch (8.5") piece of paper, or ninety-six percent (or 96%), which will create an artificial margin of one-quarter inch (or 0.5") at the top and bottom of an eleven inch (11") long piece of paper.

Where a user intends to print information within one or more specifically defined demarcations on a sheet, e.g., a sheet of adhesive labels, such automatic shrinkage or contractions initiated by a printer, a printer driver, a computing device, or an application operating on the computing device, may cause at least some of such information to transcend a boundary of a demarcation on a sheet within which the information is intended to be printed. For example, a sheet of shipping labels may include tightly defined sectors into which address components (e.g., names of recipients, names of streets, street numbers, towns, states or codes such as Zoning Improvement Plan, or "ZIP," codes, as well as one or more optically readable identifiers such as bar codes) or other information are intended to be printed. Where a document including such information provided in one or more areas or frames is created on an application or other word processor, and transmitted to a printer for printing within one or more such sections, even a slight automatic shrinkage in the dimensions of the information, e.g., shrinkage on the order of ninety-four percent or ninety-six percent, may cause some of the information for one shipping label to be printed onto an adjacent shipping label. Thus, when such labels are applied to items, the capacity for users or machines to identify such items based on their respectively applied labels is hindered, as an item may be labeled within an incorrect label, a label that includes parts of identifying information for multiple items, or a blank label.

The systems and methods of the present disclosure are directed to ensuring that information that is intended to be printed within one or more demarcations having fixed dimensions on a printed sheet may fit within such demarcations, regardless of whether a printer driver or other application automatically causes such information to be shrunk or contracted. Specifically, the systems and methods of the present disclosure are directed to identifying the dimensions of information (e.g., text, numbers or images of any type or form) that is to be printed within a demarcation on a sheet, and to automatically increasing at least one dimension of such information within areas or frames of an electronic document based on one or more factors. For example, where a printer or printer driver is expected to shrink or contract content of an electronic document by a particular percentage or ratio based on prior experiences with documents of the same type, the systems and methods disclosed herein may, upon creating the document or upon transmitting the document to the printer, modify the dimensions of the content rendered therein by a predetermined percentage or ratio that may correspond to the dimensions of a demarcation on a sheet onto which the content is to be printed.

According to one embodiment, a ratio of dimensions of content within one or more areas of frames of an electronic document that is intended to be printed within a defined demarcation of a sheet to the corresponding dimensions of the demarcation, e.g., an "inset ratio," may be determined, and the dimensions of the content within the areas or frames, or of the electronic document may be increased according to an inverse of the inset ratio. For example, where content having a height dimension of three-quarters of an inch (or 0.75") is intended for printing within a label having a height dimension of one inch (or 1"), an inset ratio of 0.75 may be defined. Similarly, where content having a length dimension of two inches (or 2") is intended for printing within a label having a length dimension of two-and-one-half inches (or 2.5"), an inset ratio of 0.80 may be defined. By expanding the dimensions of the content within the areas or frames of an electronic document, or of the electronic document itself, according to the larger of any calculable inset ratios, the content of the electronic document that is intended to fit within the boundaries of the defined demarcations of the sheet may be expected to remain within such boundaries regardless of whether the electronic document is automatically shrunk or contracted by the printer or printer driver prior to printing.

According to another embodiment, dimensions of contents of an electronic document that are to be printed within predetermined demarcated regions of an output sheet by a printer may be compared not only to the dimensions of the regions but also to any contraction ratios that may have been historically observed for electronic documents of the same type, or for the printer in general. For example, the heights or widths of regions of text, numbers or graphic images expressed within areas or frames in a type of an electronic document that are to be mass-produced on a demarcated output sheet may be compared to the heights or widths of the dimensions of the output sheet demarcations, as well as a ratio by which electronic documents of the type have been historically shrunk or contracted prior to printing by the printer. An expansion margin or factor for the electronic document may be calculated based on either the dimensions of the text, numbers or graphic images within the demarcations, an inverse of the expected contraction ratio, or both, in order to ensure that the content expressed within the areas or frames of the electronic document that are to be printed within the predetermined demarcated regions of the output sheet will remain within such regions not only if the historically observed contractions for electronic documents of the type are observed at the time of printing, but also if they are not.

In this regard, where a percentage or ratio by which a dimension of information included in areas or frames of an electronic document should be expanded is correctly selected, the systems and methods of the present disclosure may ensure that the information appropriately appears within a demarcation of a sheet regardless of whether the printer, the printer driver or an application with which the electronic document was generated automatically contracts the electronic document when preparing to print its content on the sheet.

Those of ordinary skill in the pertinent art would recognize that the systems and methods of the present disclosure would work equally appropriately where it is anticipated that a printer, a printer driver or another application will automatically expand content of an electronic document prior to printing the content on paper, planar or other sheet-like materials. In this regard, a margin or factor by which the content of the electronic document, (or of one or more areas or frames of the electronic document) may be automatically contracted in anticipation of an automatic contraction, may be determined based at least in part on a dimension associated with the content, a dimension associated with the electronic document or an area or frame thereof, as well as an amount or ratio of the automatic expansion that may be expected.

Referring to FIG. 1, a block diagram of the various components of one embodiment of a system 100 for generating automatically conforming printed labels in accordance with embodiments of the present disclosure are shown. The system 100 may include an electronic marketplace 110 (or other organization hosting one or more network sites), a smartphone 122 (or other user computing device) utilized by a customer 120 and a fulfillment center 130 that may be connected to one another over a communications network 140. The communications network 140 may be any wired network, wireless network, or combination thereof. In addition, the communications network 140 may be a personal area network, local area network, wide area network, cable network, satellite network, cellular network, or combination thereof. For example, the communications network 140 may be a publicly accessible network of linked networks, possibly operated by various distinct parties, such as the Internet. In some embodiments, the communications network 140 may be a private or semi-private network, such as a corporate or university intranet. The communications network 140 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The marketplace 110 may be owned or operated by any entity or individual that sells or otherwise makes items available from one or more sources (e.g., merchants, vendors, sellers, distributors or manufacturers of such items, generally referred to herein as "sellers"), for download, purchase, rent, lease or borrowing by customers, such as the customer 120. Additionally, the marketplace 110 itself may also be a vendor, a seller, a distributor or a manufacturer of the items that are to be made available there.

The marketplace 110 may include or operate one or more physical computer devices or servers 112 or data stores 114, and may maintain a marketplace network site 116 that may be implemented using the servers 112 or data stores 114. The network site 116 may be maintained in the form of programmed code, which may be generated manually or automatically, and in accordance with any schedule, such as in real time or in near-real time, or in one or more batch processes implemented by one or more hardware processors. Additionally, the marketplace 110 may feature hardware components and/or software applications implemented by hardware components for analyzing data received from merchants, or from customers, such as the customer 120, including data regarding sellers' product offerings, prices and any relevant accounting information, as well as data regarding customers' movements, actions, preferences, purchasing histories or personal information. The marketplace 110, servers 112, data stores 114, and network site 116 may be connected to or otherwise communicate with the customer 120 by sending and receiving digital data over the communications network 140, as indicated by lines 118.

In some embodiments, the marketplace 110 may correspond to a logical association of one or more computing devices, such as an application server for generating recommendations and determining consumption classes for users and content as described in greater detail below; a network server for creating and transmitting user interfaces; or a database server for storing data regarding users, items, etc. In some embodiments, the features and services provided by the marketplace 110 may be implemented as network services or web services consumable via the communications network 140. In further embodiments, the marketplace 110 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment.

The customer 120 may be any entity or individual that wishes to purchase, rent, lease, borrow or otherwise obtain one or more items (which may include goods, products, services or information of any type or form) from the marketplace 110. The customer 120 may utilize one or more computing devices, such as a smartphone 122, or any other like machine that may operate or access one or more software applications, such as a shopping application 124 or a browser. The smartphone 122 or the other like machines utilized by the customer 120 may be connected to, or otherwise communicate with, the marketplace 110 through the communications network 140, such as the Internet, as indicated by line 128 by sending and receiving digital data or content over the communications network 140.

The shopping application 124 or other applications operating on the smartphone 122 or other computing devices may provide one or more features, applications or user interfaces that permit the customer 120 to view and access content, such as the content provided at one or more network sites, including but not limited to the marketplace network site 116. Also, those of skill in the pertinent art will recognize that the customer 120 may use a keyboard, keypad, mouse, stylus, touch screen, or other device (not shown) or method for interacting with the smartphone 122, any other computing device, the shopping application 124 or any other application operating thereon; or to "select" an item, link, node, hub or any other aspect of the present disclosure.

The fulfillment center 130 may be a facility that is adapted to receive, store, process and/or distribute items on behalf of the marketplace 110. As is shown in FIG. 1, the fulfillment center 130 may operate one or more order processing and/or communication systems using a computing device, such as a desktop computer 132, and/or software applications having one or more user interfaces 134 (e.g., a browser); or through one or more other computing machines that may be connected to the communications network 140, as is indicated by line 138, in order to transmit or receive information in the form of digital or analog data, or for any other purpose. The desktop computer 132 may also operate or provide access to one or more reporting systems for receiving or displaying information or data regarding workflow operations. The desktop computer 132 may provide one or more interfaces, such as the user interface 134, for receiving interactions (e.g., text, numeric entries or selections) from one or more operators, users or workers, such as a worker 136, in response to such information or data. The desktop computer 132 may further operate or provide access to one or more engines for analyzing the information or data regarding the workflow operations, or the interactions received from the one or more operators, users or workers, such as the worker 136.

The fulfillment center 130 may further include any number of stations or areas for receiving items from external sources, placing items in storage, retrieving such items from storage, and distributing such items to customers. For example, the fulfillment center 130 may include one or more receiving stations having apparatuses that for receiving shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 130 may also include one or more storage areas having predefined two-dimensional or three-dimensional spaces for accommodating items and/or containers of such items, such as shelves, bins, lockers, cubbies or any other appropriate areas or regions. The fulfillment center 130 may further include one or more distribution stations having one or more regions or stations where items that have been retrieved from a designated storage area may be evaluated, prepared and packed for delivery to addresses, locations or destinations specified by customers, also by way of carriers such as cars, trucks, trailers, freight cars, container ships or cargo aircraft (e.g., manned aircraft or unmanned aircraft, such as drones).

Additionally, the fulfillment center 130 may include one or more control systems that may generate instructions for conducting operations at such receiving stations, storage areas or distribution stations. Such control systems may be associated with the desktop computer 132 or one or more other computing machines, and may communicate with the marketplace 110 or the customer 120 over the communications network 160, as indicated by line 138, through the sending and receiving of digital data. The fulfillment center 130 may also include one or more workers, staff members or machines, such as the worker 136, which may handle or transport items within the fulfillment center 130.

The printer 137 may be any peripheral, accessory or networked component or device for generating a printed hard copy output from one or more applications operating on a computing device, such as the desktop computer 132. The printer 137 may be any type of printing device or machine, such as a laser printer, an inkjet printer, a dot-matrix printer, or any other type of printer. Additionally, the printer 137 may be adapted to print onto any type or form of paper, or a sufficiently thin planar or sheet-like product or surface, such as a sheet of releasable adhesive labels that may be used for any purpose and in any number of applications. In this regard, the printer 137 may include any number of panels, trays or other assemblies, and may further include any form of hardware or firmware, or operate any form of software, for causing the printing of text, symbols, numbers or other information on paper or sheet-like products or surfaces that may be known to those of ordinary skill in the pertinent art. The printer 137 may be connected to the desktop computer 132, or to one or more other computer devices, by any form of digital or analog connection, including a direct connection or a networked connection.

The computers, servers, devices and the like described herein have the necessary electronics, software, memory, storage, databases, firmware, logic/state machines, microprocessors, communication links, displays or other visual or audio user interfaces, printing devices, and any other input/output interfaces for performing the functions described herein, or achieving the results described herein.

Except where otherwise explicitly or implicitly indicated herein, the term "marketplace," or like terms (e.g., electronic marketplace, online marketplace), may refer to any computer system(s) owned or operated by an entity or individual that sells or otherwise makes items available for download, purchase, rent, lease or borrowing, as well as the associated computer systems operated or controlled by, or on behalf of, such an entity or individual. Except where otherwise explicitly or implicitly indicated herein, the term "fulfillment center," or like terms (e.g., fulfillment and distribution centers, distribution centers, warehouses, shipment preparation facilities, processing facilities), may refer to any facility, structure or location where items may be received, stored or prepared for distribution to at least one customer, as well as the associated computer systems operated or controlled therein or thereby.

Except where otherwise explicitly or implicitly indicated herein, the term "customer," or like terms (e.g., user, consumer, shopper, buyer), may refer to any entity or individual that wishes to access one or more network-based resources using a client computing device, as well as the associated computer systems operated or controlled by a user, a customer, a consumer, etc. Furthermore, those skilled in the pertinent arts would recognize that the systems and methods disclosed herein may be utilized to optimize any process for printing content onto paper or sheet-like products or surfaces, and not just those processes that may be associated with electronic marketplaces or fulfillment centers.

Thus, process elements described as being performed by a "marketplace," a "customer" or a "fulfillment center" may be automated elements performed by their respective computer systems or devices, or implemented within software modules (or computer programs) executed by one or more computer systems or devices. Specially designed hardware could, alternatively, be used to perform certain operations.

For example, the customer 120 or the fulfillment center 130 may use any software, network-enabled or network applications operating on a computing device, e.g., the smartphone 122 or the desktop computer 132, including but not limited to the shopping application 124 or the user interface 134, or any other client-server applications or features including electronic mail (or E-mail), short or multimedia messaging service (SMS or MMS) text messages, social networking messages or postings, or other messaging techniques to communicate with (or connect to) the marketplace 110 through the communications network 140. In addition to the smartphone 122 or the desktop computer 132, the computing devices utilized by customers or fulfillment centers in accordance with the present disclosure may be any of a number of computer-related devices that are capable of communicating over the communications network 140, including but not limited to set-top boxes, personal digital assistants, digital media players, network pads, desktop computers, televisions, automobile entertainment systems, tablet computers, appliances, gaming consoles or controllers, electronic book readers, and the like.

The protocols and components for providing communication between the marketplace 110, the server 112, the data store 114 and/or the network site 116; the smartphone 122 and/or the shopping application 124; the desktop computer 132 and/or the user interface 134 are well known to those skilled in the art of computer communications and thus, need not be described in more detail herein.

The data and/or computer-executable instructions, programs, firmware, software and the like (also referred to herein as "computer-executable" components) described herein may be stored on a non-transitory computer-readable medium that is within or accessible by the smartphone 122, the desktop computer 132 and/or the marketplace servers 112, data stores 114 or network site 116, and having sequences of instructions which, when executed by a processor (such as a central processing unit, or CPU), cause the processor to perform all or a portion of the functions and/or methods described herein. Such computer-executable instructions, programs, software and the like may be loaded into the memory of the smartphone 122, the desktop computer 132 and/or the marketplace servers 112, data stores 114 or network site 116 using a drive mechanism associated with the non-transitory computer readable medium, such as a floppy drive, CD-ROM drive, DVD-ROM drive, network interface, or the like, or via external connections.

Some embodiments of the systems and methods of the present disclosure may also be provided as a computer-executable program module including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions.

For the purposes of illustration, some of the systems and methods disclosed herein may be referenced primarily in the context of printing content onto sheets having one or more defined demarcations formed therein (e.g., item labels or shipping labels), which may be applied to parcels, containers or items within a fulfillment center associated with an electronic marketplace, such as the fulfillment center 130 and the marketplace 110 shown in FIG. 1, prior to their delivery to customers, such as the customer 120. As will be recognized by those of skill in the art, however, the systems and methods disclosed herein may also be used in many other situations, and are not limited to any of the embodiments described herein.

As is set forth above, the systems and methods of the present disclosure may be used to automatically adjust at least one dimension of content within an electronic document, in anticipation of an automatic reduction in one or more dimensions of the electronic document by a printer or printer driver before printing the document on a sheet using the printer. Such automatic adjustments may be based on the dimensions of the content or of the electronic document (e.g., dimensions of one or more areas or frames therein), the dimensions of one or more defined demarcations of the sheet, or on any other relevant factor.

Figure 2:
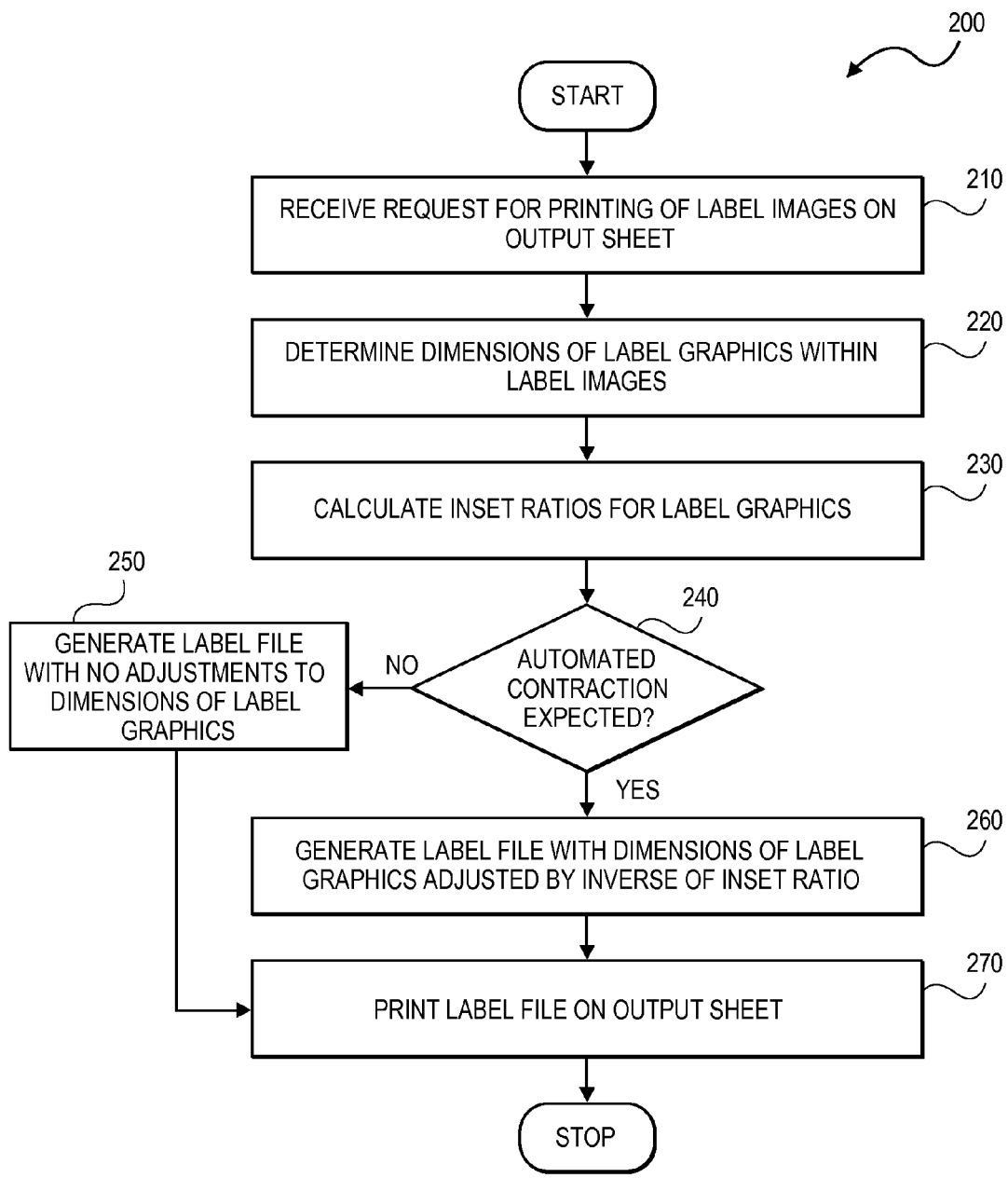
FIG. 2 is one embodiment of a process for generating automatically conforming printed labels in accordance with embodiments of the present disclosure.

Referring to FIG. 2, a flow chart 200 of an illustrative process for generating automatically conforming printed labels in accordance with the present disclosure is shown. At box 210, a request to print label images on an output sheet using a printer is received at a computer device. The label images may be item labels, personal identifiers (e.g., name tags), shipping labels or any other printed hardcopy of a predetermined size that includes information to be printed on one or more print-receptive subsets of a sheet, and such a request may be received through a selection of an icon or other aspect of a user interface, or an entry of one or more keys. At box 220, the dimensions of the label graphics to be printed within the label images are determined. For example, the sizes of the content (e.g., text, numbers or images) to be expressed within the label images on the output sheet may be determined or measured in numbers of pixels or according to any standard measure of length (e.g., millimeters or inches).

At box 230, inset ratios may be calculated for the label graphics within the label images. Such inset ratios may be calculated by comparing at least one dimension of at least one label graphic within a label image to a corresponding dimension of the label image, e.g., by comparing a height, a width and/or a diagonal length of a label graphic to a height, a width and/or a diagonal length of a label image. At box 240, it is determined whether any automatic contractions are expected prior to the printing of the label images on the printer. For example, it is determined whether the printing of the label images, or of like documents, on the printer is expected to be subject to an automatic reduction in the size of the content according to a predetermined percentage or ratio, or on any other basis. The determination as to whether any automatic contractions are expected may be based on the dimensions of the label images, their relation to margins of a sheet onto which the label images are to be printed, or on any prior experiences in label images or similar documents.

If no automatic contractions of the label images are expected, then the process advances to box 250, where the label file is generated without any adjustments to the dimensions of the label graphics, and to box 270, where the label file is printed onto the output sheet by the printer. If, however, an automatic contraction of the label images is expected, then the process advances to box 260, where the label file is generated by adjusting at least one dimension of the label graphics by an inverse of an inset ratio. For example, where an inset ratio of a dimension of the label graphic to a dimension of the label image is 0.80, the dimensions of the label graphics may be increased by twenty-five percent (25%), based on the inverse of 0.80 (or 1.25). Once the label file has been generated, the label file may be printed onto the output sheet by the printer at box 270, and the process ends.

Accordingly, by comparing the dimensions of graphics or other information within areas or frames of an electronic document that are to be printed within demarcations of a sheet against the dimensions of the areas or frames of the electronic document themselves, a ratio by which the graphics or other information may be expanded without transcending the boundaries of the demarcations of the sheet may be determined. Therefore, in the event that an automatic contraction of an electronic document that includes the graphics or other information occurs prior to printing, the content of the file may be expected to remain within the boundaries of the demarcations of the sheet. In the event that no such expansion is observed, however, the graphics or other information may also be expected to remain within their corresponding demarcations.

Figure 3A:
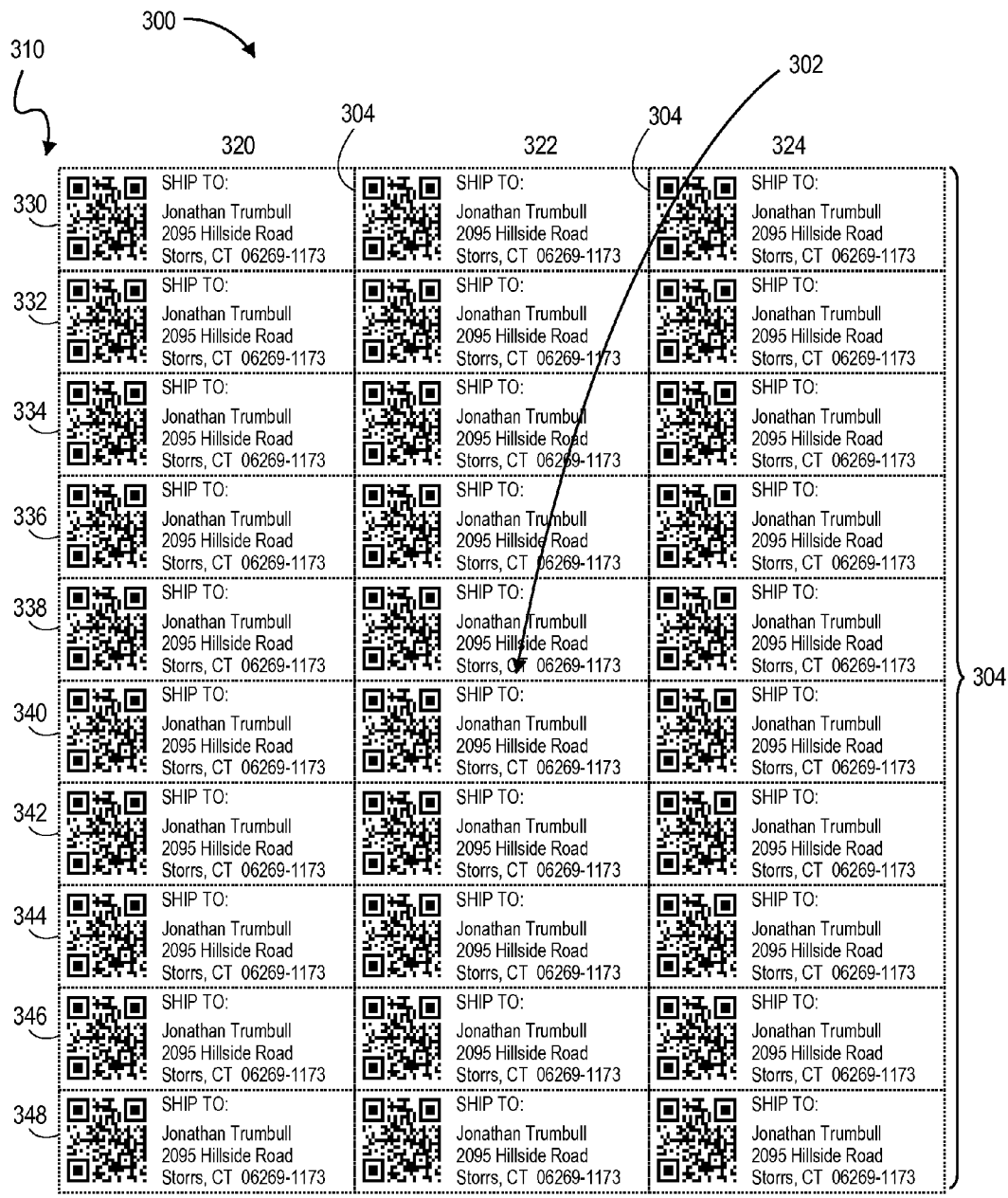
FIGS. 3A and 3B are pictorial diagrams of automatically conforming printed labels formed in accordance with embodiments of the present disclosure.

Referring to FIG. 3A, an illustrative electronic file 300 is shown having a plurality of defined areas or frames 310 including information to be printed on corresponding demarcations (e.g., labels) of a sheet. The demarcations are defined by gridlines 304. The electronic file 300 may include individual areas or frames 310 arranged in columns 320, 322, 324 and in rows 330, 332, 334, 336, 338, 340, 342, 344, 346, 348. While the frames 310 are intended to correspond to the demarcations of a sheet (e.g., individual adhesive labels on the sheet) defined by the gridlines 304, where a printer or printer driver automatically contracts the electronic file 300 prior to printing the contents therein, the individual areas or frames 310 may be misaligned with respect to the corresponding demarcations of the sheet on which they are ultimately printed. Therefore, the systems and methods disclosed herein are directed to automatically expanding the contents of the electronic file in anticipation of the automatic contraction, to an extent that the contents will remain within the demarcations of the sheet upon printing if the contraction is observed, but does not expand the contents beyond the boundaries of the demarcations of the sheet if the contraction does not occur.

An automatic contraction of the electronic file 300 may be observed about any axis or dimension of the electronic file 300. For example, the electronic file 300 may be uniformly contracted about a point, viz., within a central region 302 of a sheet prior to generating a printed output of the electronic file 300, such that one or more of the frames 310 of the electronic file 300 are uniformly drawn inwardly toward the central region 302 of the sheet and may transcend one or more of the gridlines 304 of the sheet. Alternatively, the electronic file 300 may be contracted in a single direction (e.g., horizontally or vertically), such that one or more frames 310 of the electronic file 300 are drawn toward a horizontal, vertical or other line.

Figure 3B:
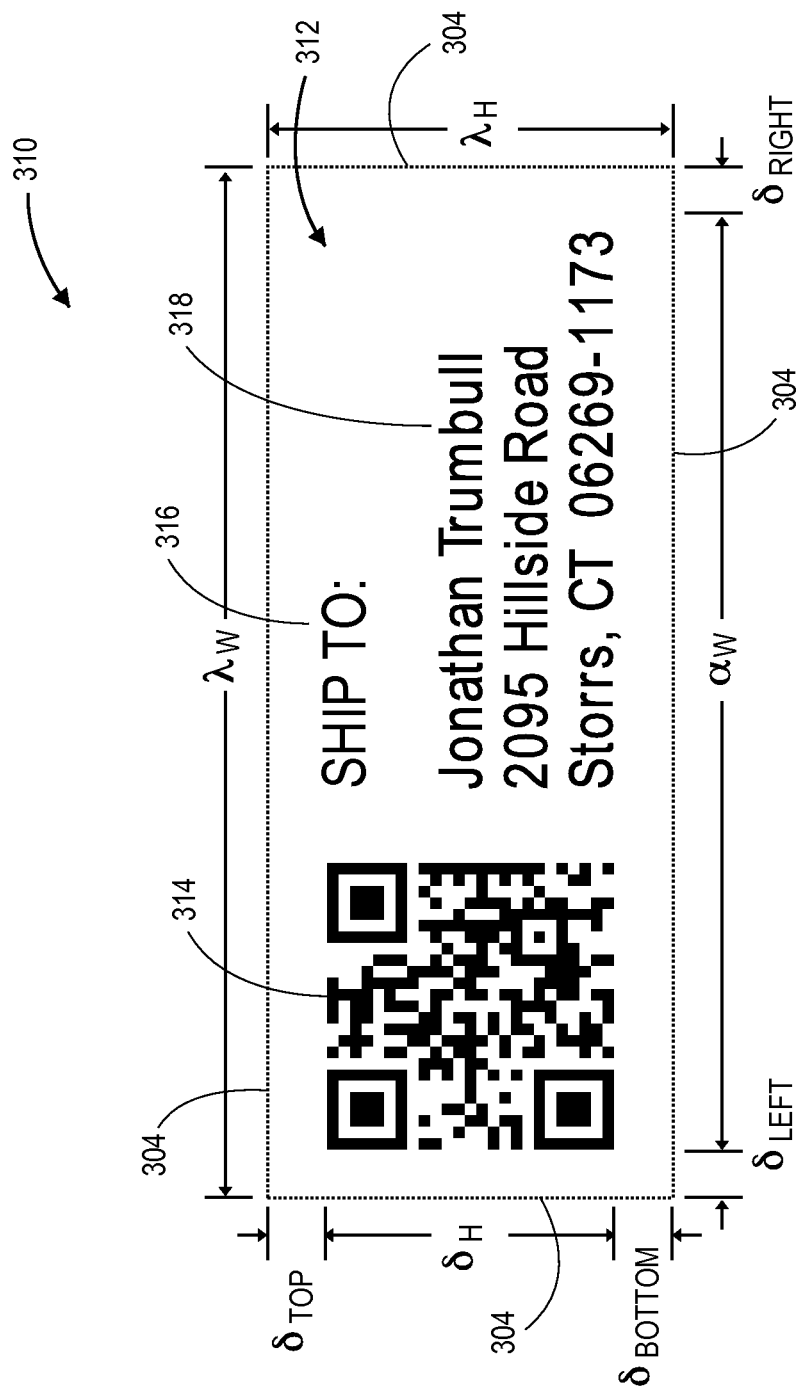

Referring to FIG. 3B, a sample one of the frames 310 of FIG. 3A is shown within a demarcation defined by the gridlines 304. The frame 310 of FIG. 3B includes content 312 such as a bar code 314, an instruction 316 and an identifier 318 of a recipient. Additionally, FIG. 3B shows dimensions of the content 312, including a width $\alpha_w$ of the content 312 and a height $\alpha_H$ of the content 312, as well as dimensions of the demarcation defined by the gridlines 304, including a width $\lambda_W$ of the demarcation and a height $\lambda_H$ of the demarcation. Moreover, FIG. 3B also shows a left margin $\delta_{LEFT}$ and a right margin $\delta_{RIGHT}$ that are defined by a difference between the width $\alpha_W$ of the content 312 and the width $\lambda_W$ of the demarcation defined by the gridlines 304. A top margin $\delta_{TOP}$ and a bottom margin $\delta_{BOTTOM}$ are defined by a difference between the height $\alpha_H$ of the content 312 and the height $\lambda_H$ of the demarcation defined by the gridlines 304.

With reference to FIG. 3B, the systems and methods of the present disclosure are directed to automatically expanding at least one dimension of the content 312 when generating an electronic document, in anticipation of an automatic reduction in at least one dimension of the content 312 when the electronic document is printed. For example, according to some embodiments of the present disclosure, such as the process represented in the flow chart 200 of FIG. 2, inset ratios of the width $\alpha_W$ of the content 312 to the width $\lambda_W$ of the demarcation defined by the gridlines 304, or of the height $\alpha_H$ of the content 312 to the height $\lambda_H$ of the demarcation defined by the gridlines 304, may be calculated, and the content 312 may be automatically expanded based at least in part on the inset ratios. Expanding the content 312 by an inverse of an inset ratio maximizes the size of the content 312 in the event of an automatic contraction initiated by a printer driver, while ensuring that the content 312 will remain within the demarcation 304 when the content 312 is printed in the event that no automatic contraction occurs.

Furthermore, according to the systems and methods of the present disclosure, an expansion of the content 312 may occur in one or more dimensions. For example, as is discussed above, and referring again to FIG. 3B, where an automatic contraction may be anticipated along a single axis or dimension, e.g., a width or a height of an electronic document, the content 312 may be automatically expanded along the single axis or dimension, e.g., into the left margin $\delta_{LEFT}$ and the right margin $\delta_{RIGHT}$, or into the top margin $\delta_{TOP}$ and the bottom margin $\delta_{BOTTOM}$. Where the automatic contraction may be anticipated along multiple axes or dimensions, e.g., both the width and the height of the electronic document, the content may be automatically expanded along the multiple axes or dimensions, e.g., into each of the margins.

The systems and methods of the present disclosure may also determine an amount or extent by which an automatic contraction of an electronic document may be anticipated, and determine whether sufficient space remains within demarcations on a sheet to permit the content that is intended to be printed within one or more of the demarcations may be expanded therein according to an inverse of the amount or extent of contraction. For example, where a ninety-four percent (94%) automatic contraction is anticipated, the systems and methods disclosed herein may identify dimensions of the content to be printed within the demarcations, and determine whether the content may be expanded by 6.38%, e.g., an inverse of the anticipated 94% automatic contraction, and remain within the areas or frames in the event that the automatic contraction is not observed.

Figure 4:
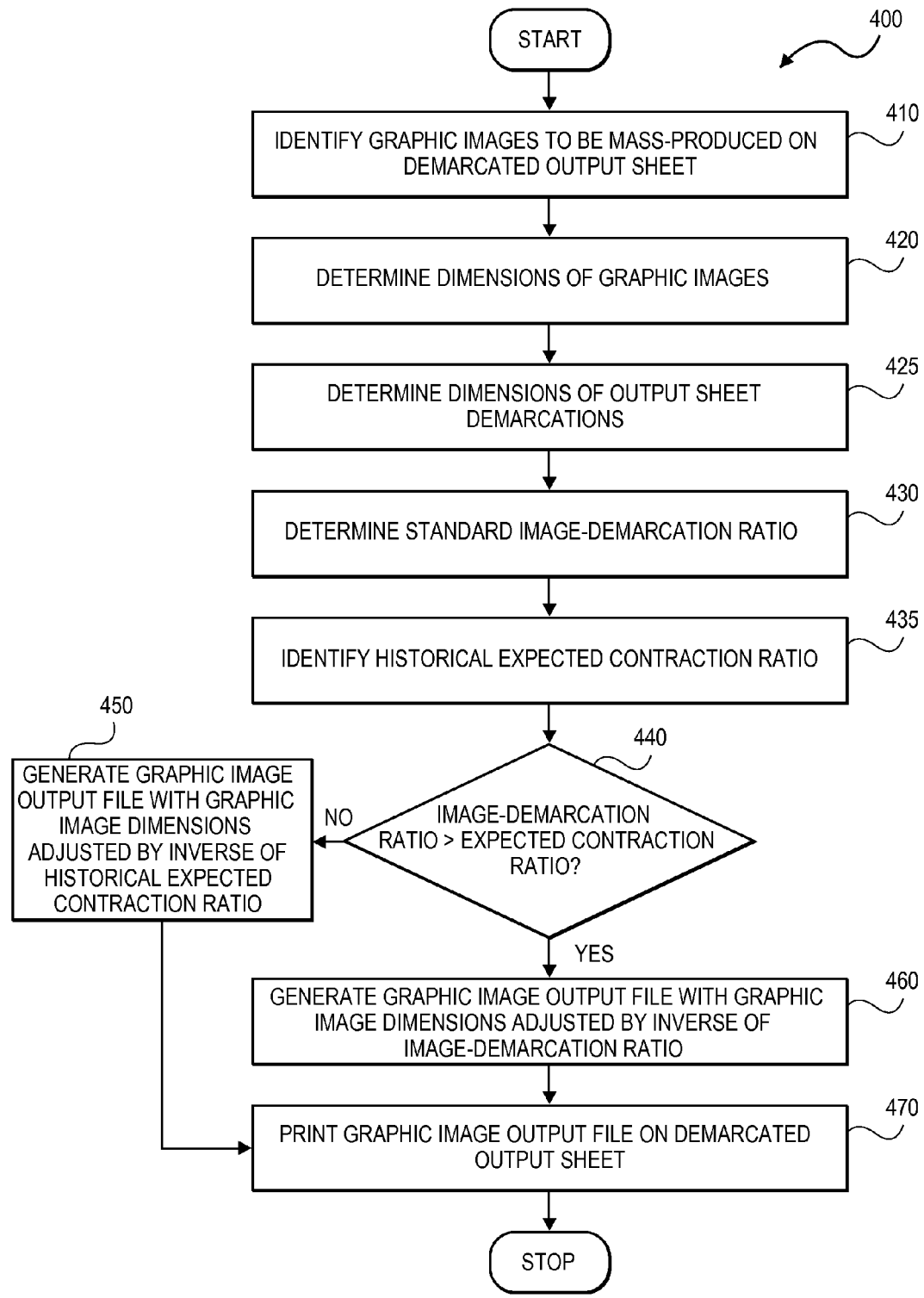
FIG. 4 is one embodiment of a process for generating automatically conforming printed labels in accordance with embodiments of the present disclosure.

Referring to FIG. 4, a flow chart 400 of an illustrative process for generating automatically conforming printed labels in accordance with the present disclosure is shown. At box 410, graphic images that are to be mass-produced on a demarcated output sheet are identified. The images or other information may be printed on any type of output sheet having any form of demarcations, such as a sheet of adhesive labels. At box 420, the dimensions of the graphic images are determined, and at box 425, the dimensions of the output sheet demarcations are determined. Such dimensions may be measured according to any standard, such as numbers of pixels, or length in English units or metric units.

At box 435, a standard image-demarcation ratio is determined. For example, ratios of dimensions of the images to corresponding dimensions of the demarcations, e.g., a ratio of the height $\alpha_H$ of the content 312 to the height $\lambda_H$ of the demarcation defined by the gridlines 304, or of any other dimension of the image to any corresponding image of the demarcation, may be calculated. The dimensions considered may be based on any given individual image to be printed within any given demarcation, or an average or maximum dimension of images as compared to an average or minimum dimension of demarcations.

At box 440, it is determined whether the image-demarcation ratio exceeds the expected contraction ratio. For example, referring again to FIG. 3B, a ratio of the width $\alpha_W$ of the content 312 to the width 4 of the demarcation defined by the gridlines 304, or $(\alpha_W/\lambda_W)$, may be calculated and compared by a ratio by which the width $\lambda_W$ is expected to be contracted. Comparing the image-demarcation ratio, or $(\alpha_W/\lambda_W)$, to an anticipated ratio of contraction is significant at least because expansion based upon an inverse of a larger ratio is smaller than expansion based upon an inverse of a smaller ratio, and vice versa. If expansion is to be based on an image-demarcation ratio that is less than the anticipated ratio of contraction, such an expansion may cause the content to transcend the boundaries of the demarcation defined by the gridlines 304 in the event that the anticipated contraction is not observed.

If the image-demarcation ratio is not greater than the expected contraction ratio, thereby implying that the content may not be expanded according to the inverse of the image-demarcation ratio without risking transcending one or more of the boundaries of the demarcations, then the process advances to box 450, where the graphic image output file is generated by adjusting the graphic image dimensions by the inverse of the expected contraction ratio, and to box 470, where the graphic image output file is printed on the demarcated output sheet, and the process ends. For example, where an eighty-five percent (85%) contraction of an electronic document is expected, and a two-inch wide (2") graphic image is intended to be printed within a two-and-one-half inch wide (2.5") demarcation, the ratio of the image-demarcation ratio, or 0.80, to the expected contraction ratio is less than one, and the width dimensions of the electronic document may not be expanded according to the image-demarcation ratio.

If the quotient of the ratios is greater than one, then the process advances to box 460, where the graphic image output file is generated by adjusting the graphic image dimensions by the inverse of the image-demarcated ratio. For example, where the image-demarcation ratio is 0.80, the graphic image dimensions may be increased based on an inverse of the ratio, or by twenty-five percent (or 25%). At box 470, the graphic image output file is printed on the demarcated output sheet, and the process ends.

Accordingly, the systems and methods of the present disclosure may determine whether information that is intended to be printed within a demarcation of a sheet (e.g., an adhesive label or other defined region or sector of the sheet) and for which an automatic contraction of the information is anticipated may be automatically expanded based on the dimensions of the information, the dimensions of the demarcation, region or sector, or the extent of the anticipated automatic contraction. If the information may be expanded to fill, but not exceed, the demarcation in the event that the anticipated contraction does not occur, the dimensions of the information may be expanded by an inverse of a ratio of the dimensions of the information to the dimensions of the demarcation when the electronic document is generated or at any other relevant time, such as when the electronic document is stored or backed up, or when a command or instruction for printing the electronic document is received. Alternatively, the information may be expanded by an inverse of the anticipated contraction ratio.

Figure 5A:
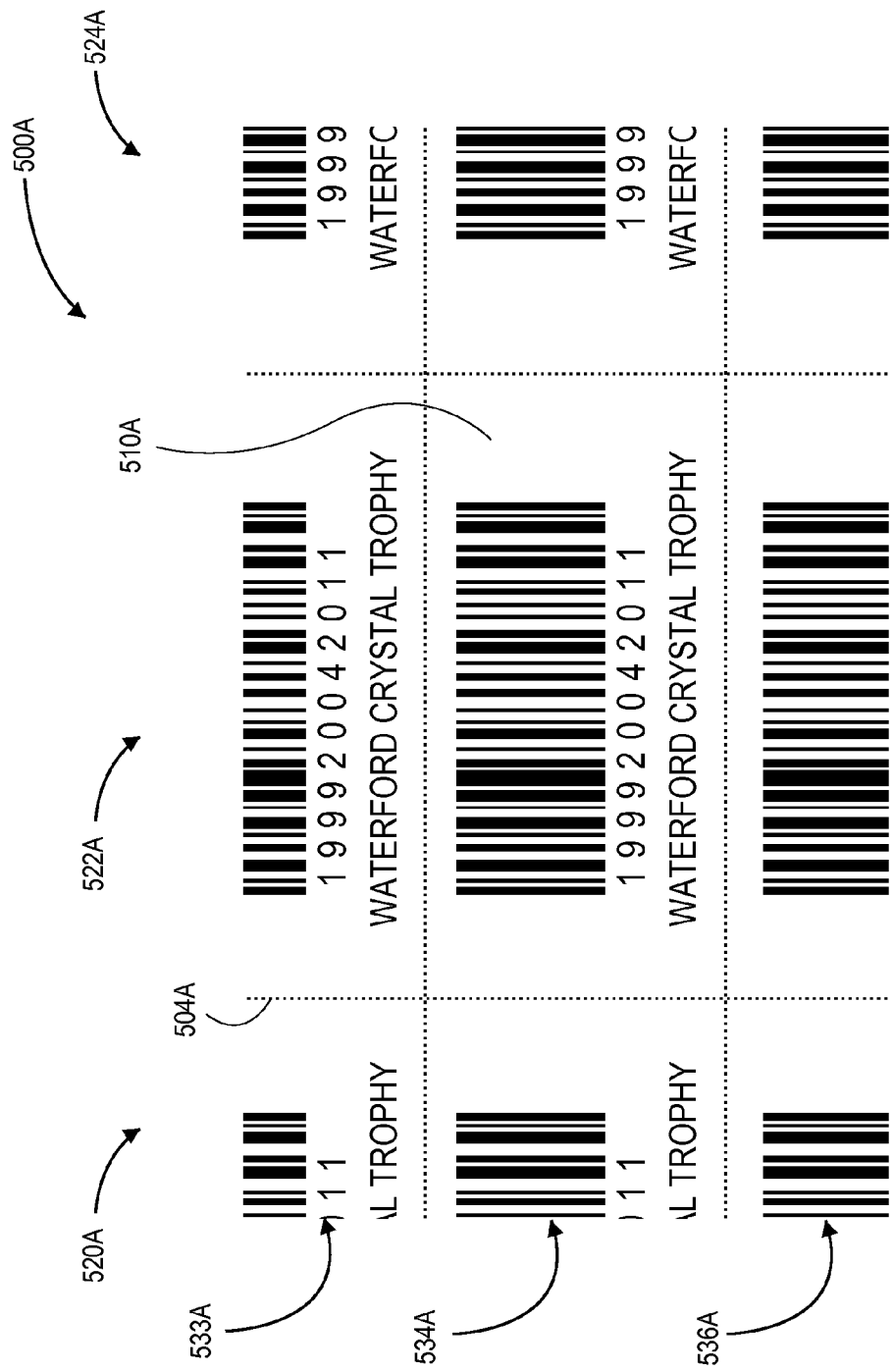
FIGS. 5A, 5B and 5C are pictorial diagrams of automatically conforming printed labels formed in accordance with embodiments of the present disclosure.
Figure 5B:
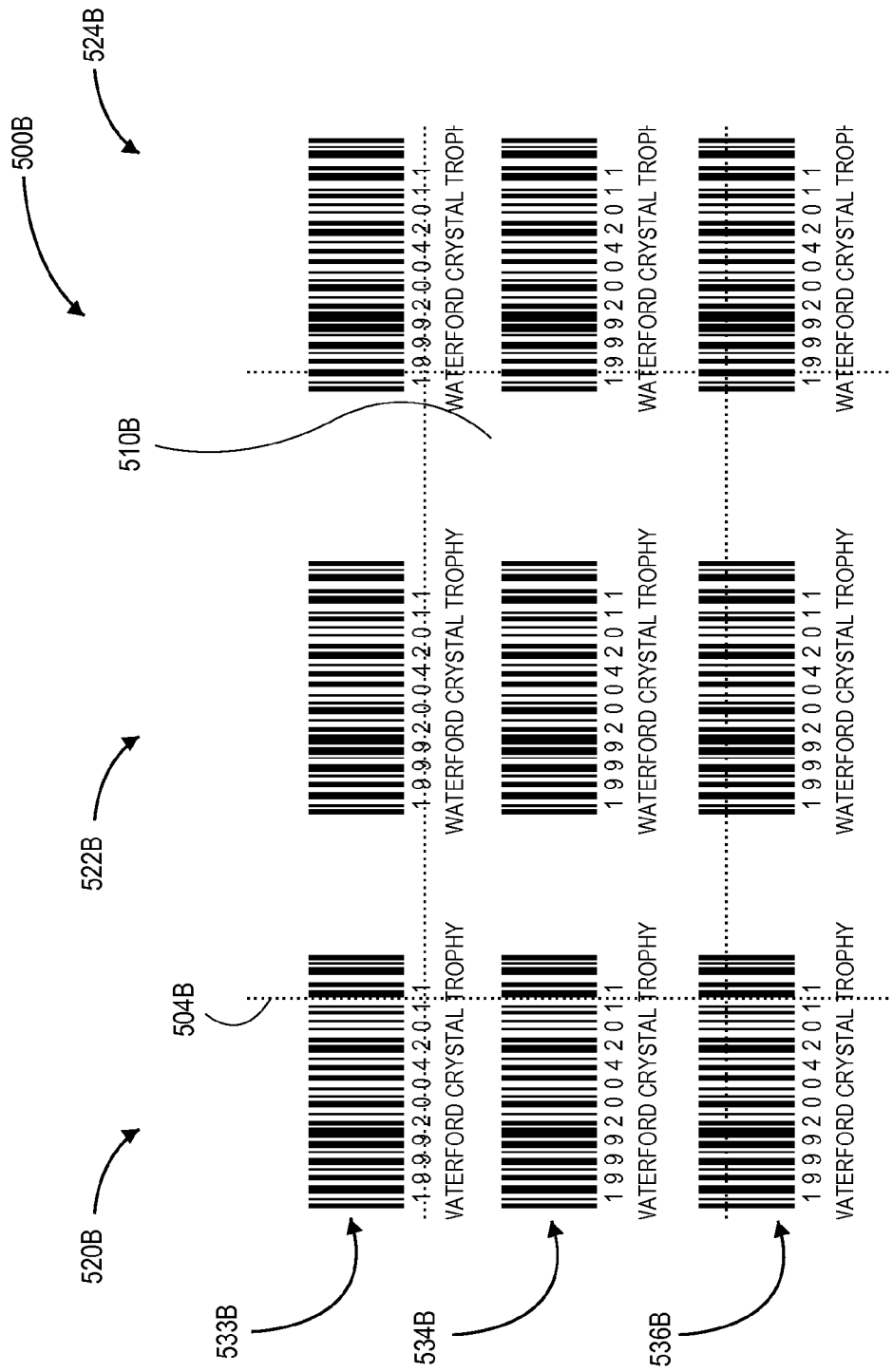
Figure 5C:
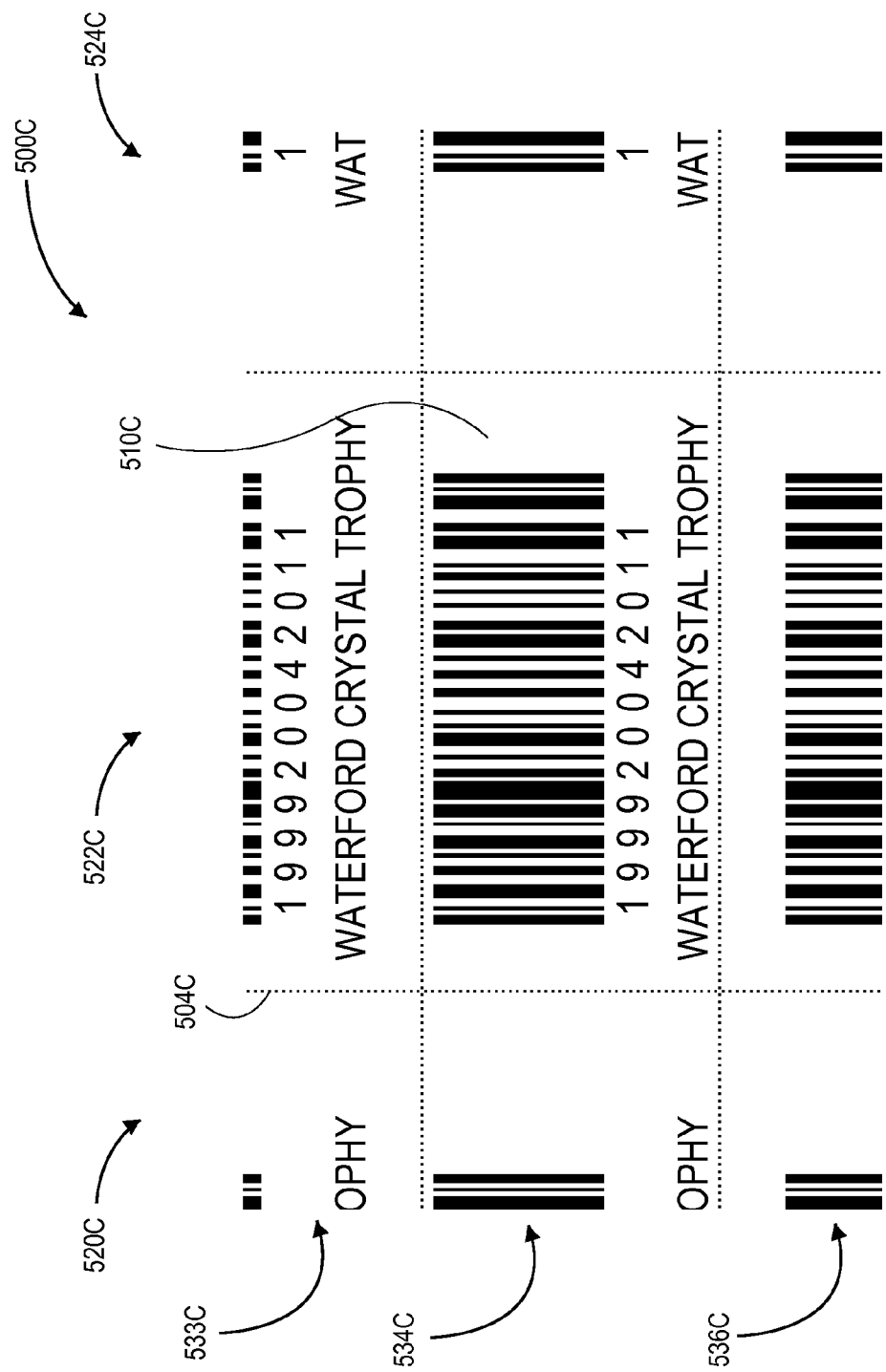

Referring to FIGS. 5A, 5B and 5C, a relation of dimensions of images or information to be printed within demarcations of a printed sheet to dimensions of areas or frames of an electronic document are shown. Except where otherwise noted, reference numerals preceded by the number "5" in FIG. 5A, 5B or 5C indicate components or features that are similar to components or features having reference numerals preceded by the number "3" shown in FIG. 3A or FIG. 3B.

Referring to FIG. 5A, an illustrative electronic file 500A having individual frames 510A arranged in columns 520A, 522A, 524A and rows 533A, 534A, 535A, and a demarcated grid 504A identifying the corresponding demarcations of a printed sheet are shown. The graphic images included within the frames 510A of the electronic file 500A include a bar code and associated text. In the event that the electronic file 500A is not automatically contracted by a printer or printer driver upon a print command or instruction, the graphic images included within the frames 510A should be printed as intended within the corresponding frames of a printed sheet, as defined by the demarcated grid 504A.

In the event that the electronic file 500A is automatically contracted by a printer or printer driver, however, the graphic images within one or more of the frames 510A may, when printed, transcend the boundaries of the demarcated grid 504A of the printed sheet. Referring to FIG. 5B, the frames 510B of an electronic file 500B and the demarcated grid 504B identifying areas and frames of a printed sheet are shown. The electronic file 500B of FIG. 5B is equivalent to the electronic file 500A of FIG. 5A following an automatic contraction thereof by a printer or printer driver. The graphic images of the frames 510B are shown as extending over the lines of the demarcated grid 504B, such that content of one or more frames may extend into an adjacent frame. Where the sheet onto which the graphic images are to be printed is an adhesive label sheet, the misalignment of the frames 510B with respect to the demarcated grid 504B may cause the printing of labels that do not contain sufficient information to identify an item to which the labels are affixed, or which incorrectly identify an item. This may lead to failures or inefficiencies in any associated processes for which the labels are intended.

As is discussed above, the systems and methods of the present disclosure may cause an automatic expansion of one or more graphic images that are intended to be printed within predefined areas or frames on a demarcated sheet, such as the areas or frames defined by the demarcated grids 500A, 500B of FIGS. 5A and 5B. Referring to FIG. 5C, the frames 510C of an electronic file 500C and the demarcated grid 504C identifying demarcations of a printed sheet are shown. The electronic file 500C of FIG. 5C is equivalent to the electronic file 500A of FIG. 5A following an automatic expansion thereof by one or more of the systems and methods disclosed herein.

As is shown in FIG. 5C, the graphic images within the frames 510C are expanded to encompass some or all of the region within the demarcated grid 504C of the printed sheet. Thus, the graphic images approach, but do not transcend, any of the lines of the demarcated grid 504C or otherwise extend into any adjacent frames. In this regard, in the event that the electronic file 500C is transmitted to a printer for printing, the graphic images may be printed within the corresponding frames of a printed sheet, such as are shown by the demarcated grid 504C, whether the electronic file 500C is automatically contracted or not.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Although some of the embodiments described herein or shown in the accompanying figures refer to generating electronic files or documents which, when printed onto sheets of adhesive labels, may create address labels or shipping labels for use during fulfillment center operations, the systems and methods are not so limited, and may be used in any printing application in which a printer, printer driver or other hardware or software component may cause an undesired automatic contraction of the contents thereof upon the receipt of a print instruction or request. For example, the systems and methods disclosed herein may be used in the printing of any document having fixed geographic constraints, or on any other kind of label.

As is discussed above, those of ordinary skill in the pertinent art would recognize that the teachings set forth above with regard to automatically expanding documents in response to anticipated contractions thereof may apply in reciprocal fashion to automatically contracting documents in response to anticipated expansions thereof. Additionally, those of ordinary skill in the pertinent art would recognize that electronic documents may be generated and automatically expanded in accordance with the present disclosure from any type of application, such as word processing applications, spreadsheet or accounting applications, presentation applications or browsers rendering network pages programmed in Hypertext Markup Language (or "HTML"), or any variants thereof.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIG. 2 or 4, the order in which the boxes or elements of the methods or processes are listed is not intended to be construed as a limitation on the disclosure, and any number of the method or process boxes or elements can be combined in any order and/or in parallel to implement the methods or processes described herein. Also, the drawings herein are not drawn to scale.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the subject matter of this disclosure has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
   receiving information to be included in a frame of an electronic document from a user, wherein the information comprises at least one of an image or a set of text;
   identifying, using a computer processor, a dimension of the information;
   identifying, using the computer processor, a dimension associated with the frame of the electronic document;
   determining, using the computer processor, an anticipated contraction of the electronic document by a printing application associated with a printer device;
   increasing, using the computer processor, the dimension of the information based at least in part on at least one of the dimension associated with the frame of the electronic document or the anticipated contraction of the electronic document; and
   storing the electronic document in a data store, wherein the electronic document comprises the information having the increased dimension associated with the frame of the electronic document.

2. The computer-implemented method of claim 1, further comprising:
   receiving an instruction to print the electronic document on a sheet having a plurality of demarcated regions, wherein a region of the demarcated regions corresponds to the frame of the electronic document; and
   transmitting the electronic document to the printing application associated with the printer device over a network.

3. The computer-implemented method of claim 2, wherein the region of the demarcated regions comprises a releasable adhesive label.

4. The computer-implemented method of claim 1, wherein increasing the dimension of the information comprises:
   calculating, using the computer processor, a ratio of the dimension of the information to the dimension associated with the frame of the electronic document; and
   increasing, using the computer processor, the dimension of the information according to an inverse of the ratio.

5. The computer-implemented method of claim 1, wherein increasing the dimension of the information comprises:
   determining, using the computer processor, a ratio of the anticipated contraction of the electronic document; and
   increasing, using the computer processor, the dimension of the information according to an inverse of the ratio.

6. A non-transitory computer-readable medium having computer-executable instructions stored thereon, wherein the instructions, when executed, cause a computer system having computer processor to perform operations comprising:
   identifying information to be printed in a defined sector of a sheet by a printing device;
   identifying a dimension associated with the information;
   determining whether an automatic contraction of the information by the printing device along the dimension is anticipated; and
   in response to determining that the automatic contraction of the information by the printing device along the dimension is anticipated,
      causing an expansion of the information along the dimension by a predetermined amount.

7. The non-transitory computer-readable medium of claim 6, wherein the operations further comprise:
   storing an electronic document comprising a frame having the information expanded along the dimension included therein.

8. The non-transitory computer-readable medium of claim 7, wherein the frame of the electronic document corresponds to the defined sector of the sheet.

9. The non-transitory computer-readable medium of claim 6, wherein causing the expansion of the information along the dimension by the predetermined amount comprises:
   identifying a dimension of the defined sector of the sheet, wherein the expansion of the information along the dimension by the predetermined amount is based at least in part on the dimension of the defined sector of the sheet.

10. The non-transitory computer-readable medium of claim 9, wherein causing the expansion of the information along the dimension by the predetermined amount further comprises:
    calculating a ratio of the dimension associated with the information to the dimension of the defined sector of the sheet, wherein the predetermined amount is based at least in part on an inverse of the ratio.

11. The non-transitory computer-readable medium of claim 6, wherein the predetermined amount is based at least in part on an anticipated amount of the automatic contraction.

12. The non-transitory computer-readable medium of claim 11, wherein causing the expansion of the information along the dimension by the predetermined amount comprises:
    determining a ratio of the automatic contraction based at least in part on the anticipated amount, wherein the predetermined amount is based at least in part on an inverse of the ratio.

13. The non-transitory computer-readable medium of claim 11, wherein the anticipated amount is one of ninety-four percent or ninety-six percent.

14. The non-transitory computer-readable medium of claim 6, wherein the defined sector of the sheet is a sector of a plurality of defined sectors of the sheet.

15. The non-transitory computer-readable medium of claim 14, wherein each of the plurality of defined sectors corresponds to a releasable adhesive label on the sheet.

16. The non-transitory computer-readable medium of claim 6, wherein the operations further comprise:
receiving an instruction to print at least a portion of the electronic document on the printing device; and
causing at least the portion of the electronic document to be printed by the printing device.

17. The non-transitory computer-readable medium of claim 6, wherein the operations further comprise:
determining a dimension of the defined sector of the sheet;
calculating a first ratio of the dimension associated with the information to the dimension of the defined sector of the sheet;
determining a second ratio of the automatic contraction;
determining whether the first ratio exceeds the second ratio; and
in response to determining that the first ratio exceeds the second ratio,
calculating the predetermined amount based at least in part on the first ratio.

18. The non-transitory computer-readable medium of claim 17, wherein the operations further comprise:
in response to determining that the first ratio does not exceed the second ratio,
calculating the predetermined amount based at least in part on the second ratio.

19. The non-transitory computer-readable medium of claim 6, wherein the printing device is one of a laser printer, a multi-dimensional printer, an inkjet printer or a dot-matrix printer.

20. The non-transitory computer-readable medium of claim 6, wherein the information comprises at least one of an image or a set of text.

21. The non-transitory computer-readable medium of claim 6, wherein the information comprises an address, and wherein the defined sector is a releasable address label affixed to the sheet.

22. A computer system comprising:
a data store configured to store computer-executable instructions;
a printer device configured to generate printed outputs; and
a computing device in communication with the data store and the printer device, wherein the computing device, when executing the computer-executable instructions, is configured to at least:
receive information from a user to be printed within a predetermined region of a sheet by the printing device;
identify a contraction ratio associated with the printing device;
calculate an inset ratio based on a dimension of the information and a dimension of the predetermined region of the sheet;
expand the information based at least in part an inverse of at least one of the contraction ratio or the inset ratio;
generate an electronic document comprising a frame corresponding to the predetermined region of the sheet; and
cause the expanded information to be placed in the frame.

23. The computer system of claim 22, wherein the computing device, when executing the computer-executable instructions, is further configured to at least:
provide an instruction to generate a printed output of at least a portion of the electronic document to the printer device.

* * * * *